US009625322B2

(12) United States Patent
Lee et al.

(10) Patent No.: US 9,625,322 B2
(45) Date of Patent: Apr. 18, 2017

(54) ANTENNA MODULE FOR TRANSMITTING OR RECEIVING TERAHERTZ WAVES AND FOCAL PLANE ARRAY STRUCTURE FOR REAL-TIME TERAHERTZ IMAGING

(71) Applicant: KOREA ADVANCED INSTITUTE OF SCIENCE AND TECHNOLOGY, Yuseong-gu, Daejeon (KR)

(72) Inventors: Sang-Gug Lee, Daejeon (KR); Sun-A Kim, Daejeon (KR); Kyoung-Young Choi, Daejeon (KR); Dae-Woong Park, Daejeon (KR); Seok-Kyun Han, Daejeon (KR)

(73) Assignee: Korea Advanced Institute of Science and Technology, Yuseong-gu, Daejeon (KR)

( * ) Notice: Subject to any disclaimer, the term of this patent is extended or adjusted under 35 U.S.C. 154(b) by 245 days.

(21) Appl. No.: 14/509,264

(22) Filed: Oct. 8, 2014

(65) Prior Publication Data

US 2015/0346034 A1    Dec. 3, 2015

(30) Foreign Application Priority Data

May 28, 2014    (KR) ......................... 10-2014-0064123

(51) Int. Cl.
*G01J 5/10*      (2006.01)
*G01J 5/02*      (2006.01)
(Continued)

(52) U.S. Cl.
CPC .............. *G01J 5/10* (2013.01); *G01J 5/0215* (2013.01); *G01J 5/0837* (2013.01); *H01Q 1/00* (2013.01);
(Continued)

(58) Field of Classification Search
CPC .......... G01J 5/10; G01J 5/0837; G01J 5/0215; G01J 2005/0077; H01Q 1/2283; H01Q 1/00; H01Q 23/00; H01Q 21/065
(Continued)

(56) References Cited

U.S. PATENT DOCUMENTS

| 2002/0067480 A1* | 6/2002 | Takahashi .......... G01N 21/3581 |
| | | 356/317 |
| 2013/0200789 A1* | 8/2013 | Baik ...................... H01J 25/34 |
| | | 315/39.3 |
| 2014/0145883 A1* | 5/2014 | Baks ................... H01Q 1/2283 |
| | | 343/700 MS |

FOREIGN PATENT DOCUMENTS

| JP | 2006262054 A | 9/2006 |
| KR | 1020050065861 A | 6/2005 |

(Continued)

OTHER PUBLICATIONS

Korean Office Action issued in corresponding Korean Application No. 10-2014-0064123 mailed Jun. 29, 2015.

*Primary Examiner* — David Porta
*Assistant Examiner* — Gisselle Gutierrez
(74) *Attorney, Agent, or Firm* — Davis & Bujold PLLC; Michael J. Bujold (57) ABSTRACT

Provided is an antenna module that comprises an antenna comprising a radiation patch for transmitting or receiving the terahertz wave, and a first ground disposed away from the radiation patch, the first ground having a hole, an integrated circuit board having a signal processing unit configured to generate the terahertz wave or to process the terahertz wave received through the antenna, the integrated circuit board being disposed under the antenna and a via configured to connect the radiation patch with the signal processing unit, the via passing through the hole.

13 Claims, 4 Drawing Sheets

(51) Int. Cl.
    *H01Q 1/00*     (2006.01)
    *G01J 5/08*     (2006.01)
    *H01Q 1/22*     (2006.01)
    *G01J 5/00*     (2006.01)
    *H01Q 21/06*     (2006.01)
    *H01Q 23/00*     (2006.01)

(52) U.S. Cl.
    CPC .... *H01Q 1/2283* (2013.01); *G01J 2005/0077* (2013.01); *H01Q 21/065* (2013.01); *H01Q 23/00* (2013.01)

(58) Field of Classification Search
    USPC ........................................................ 250/349
    See application file for complete search history.

(56) References Cited

FOREIGN PATENT DOCUMENTS

| | | |
|---|---|---|
| KR | 1020080051435 A | 6/2008 |
| KR | 10-2013-0053490 A | 5/2013 |

* cited by examiner

ANTENNA MODULE FOR TRANSMITTING OR RECEIVING TERAHERTZ WAVES AND FOCAL PLANE ARRAY STRUCTURE FOR REAL-TIME TERAHERTZ IMAGING

CROSS-REFERENCE TO RELATED APPLICATION(S)

This application claims the benefit under 35 U.S.C. §119 (a) of Korean Patent Application No. 10-2014-0064123, filed on May 28, 2014 in the Korean Intellectual Property Office, the entire disclosure of which is incorporated herein by reference for all purposes.

BACKGROUND OF THE INVENTION

Field of the Invention

The present invention relates to an antenna module for transmitting or receiving terahertz waves, which can reduce an installation area of a receiving antenna and a signal processing unit and also improve radiation efficiency, and a focal plane array structure for real-time terahertz imaging.

Description of the Related Art

A terahertz camera using terahertz waves having both of transmittance of electromagnetic waves and straightness of light waves can be applied to fields of medicine, security, or the like.

As an antenna for a terahertz imaging sensor using CMOS technology, a patch antenna has been mainly used in order to prevent loss through a silicon substrate. A size of a patch antenna is inversely proportional to a frequency of an input signal. If a signal in a sub-terahertz band is used, a size of an antenna can be as large as several hundred micrometers. However, in order to obtain a high-resolution image, a size of a pixel needs to be small. Therefore, a technology has been developed in a direction to reduce a size of an antenna by increasing a frequency of a signal.

However, there is a limit in reducing a size of an antenna. Therefore, a technology has been developed in a direction to reduce a size of the whole transceiver by reducing the whole area of an antenna and a signal processing unit configured to process terahertz waves received through the antenna.

The present invention is based on the technology described in Korean Patent Laid-open Publication No. 10-2013-0053490 (May 24, 2013).

An object of the present invention is to provide an antenna module for transmitting or receiving high-resolution terahertz waves and a focal plane array structure for real-time terahertz imaging.

The other objects and advantages of the present invention can be understood from the following description and more clearly understood from the exemplary embodiments of the present invention. Further, it can be easily seen that the objects and advantages of the present invention can be realized by means as illustrated in the claims and a combination thereof.

SUMMARY OF THE INVENTION

In one general aspect, there is provided an antenna module that comprises an antenna comprising a radiation patch for transmitting or receiving the terahertz wave, and a first ground disposed away from the radiation patch, the first ground having a hole, an integrated circuit board having a signal processing unit configured to generate the terahertz wave or to process the terahertz wave received through the antenna, the integrated circuit board being disposed under the antenna and a via configured to connect the radiation patch with the signal processing unit, the via passing through the hole.

The antenna module for transmitting or receiving the terahertz wave may further comprise a transmission line matching an impedance between the antenna and the signal processing unit included in the integrated circuit board, the transmission line disposed away from the first ground and being located under the first ground.

The transmission line may further comprise a metal line combined with the via, the metal line disposed away from the first ground and being located under the first ground, and a second ground disposed away from the metal line and being located under the metal line.

The first ground configured to function as a ground for the radiation patch of the antenna and the metal line.

The integrated circuit board comprises a detector configured to detect the terahertz wave received through the antenna, a voltage-controlled oscillator configured to output a oscillation frequency according to a output voltage of the detector, a frequency digital convertor configured to convert the oscillation frequency output from the voltage-controlled oscillator to a digital signal, and a digital signal processing unit configured to generate a data based on the converted digital signal.

The integrated circuit board comprises an oscillator configured to generate the terahertz wave and an amplifier configured to amplify the generated terahertz wave.

The antenna module for transmitting or receiving the terahertz wave may further comprise a mutual connecting line configured to mutually connect the detector, the voltage-controlled oscillator, the frequency digital convertor, and the digital signal processing unit, the mutual connecting line being disposed under the antenna.

The antenna module may further comprise a mutual connecting line configured to mutually connect the oscillator and the amplifier, the mutual connecting line being disposed under the antenna.

In another aspect, there is provided a focal plane array structure for real-time terahertz imaging may comprise an antenna array where the plurality of antenna modules are spaced to be disposed, the antenna module including a radiation patch receiving the terahertz wave, and a first ground disposed away from the radiation patch, the first ground having a hole, an integrated circuit board comprising a signal processing unit disposed under the antenna array, and configured to process the terahertz wave received through the antenna, and a via configured to connect the radiation patch and the signal processing unit, the via passing through the hole.

The focal plane array may further comprise a transmission line matching an impedance between the antenna and the signal processing unit included in the integrated circuit board, the transmission line disposed away from the first ground and being located under the first ground.

The transmission line may comprise a metal line combined with the via, the metal line disposed away from the first ground and being located under the first ground, and a second ground disposed away from the metal line and being located under the metal line.

The first ground may be formed as a single ground corresponding to the antenna array.

The integrated circuit board may be disposed with each antenna corresponding to the signal processing unit for processing the received terahertz wave.

The integrated circuit board comprises a detector configured to detect the terahertz wave received through the antenna, a voltage-controlled oscillator configured to output a oscillation frequency according to a output voltage of the detector, a frequency digital convertor configured to convert the output oscillation frequency from the voltage-controlled oscillator to a digital signal, and a digital signal processing unit configured to generate a data based on the converted digital signal.

The detector is correspondently disposed with the each antenna, each the voltage-controlled oscillator, the frequency digital convertor, and the digital signal processing unit is single, and configured to totally process the received terahertz wave through the detector.

The focal plane array of may further comprise a mutual connecting line configured to mutually connect the detector, the voltage-controlled oscillator, the frequency digital convertor, and the digital signal processing unit, the mutual connecting line being disposed under the antenna.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, exemplary embodiments of the present invention will be described in detail with reference to the accompanying drawings so that the present invention may be readily implemented by those skilled in the art. However, it is to be noted that the present invention is not limited to the exemplary embodiments but can be embodied in various other ways. In drawings, parts irrelevant to the description are omitted for the simplicity of explanation, and like reference numerals denote like parts through the whole document.

Through the whole document, the term "comprises or includes" and/or "comprising or including" used in the document means that one or more other components, steps, operation and/or existence or addition of elements are not excluded in addition to the described components, steps, operation and/or elements unless context dictates otherwise. Further, the terms "part", "group", and "module" described herein refer to a unit that processes at least one function or an operation and can be implemented in software, hardware, or a combination of hardware and software.

Figure 1:
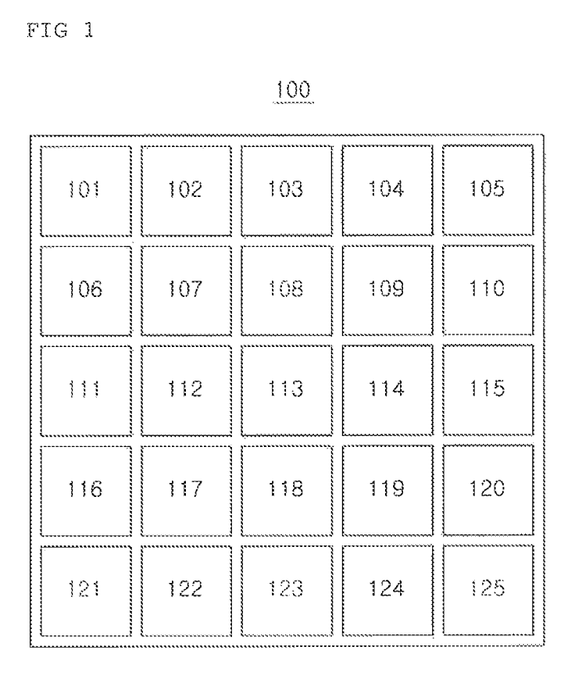
FIG. 1 is a diagram provided to explain a focal plane array structure for real-time terahertz imaging according to an exemplary embodiment of the present invention.

FIG. 1 is a diagram provided to explain a focal plane array structure for real-time terahertz imaging according to an exemplary embodiment of the present invention.

Referring to FIG. 1, a focal plane array 100 may include multiple antenna modules 101 to 125.

Each of the antenna modules 101 to 125 may include an antenna, an integrated circuit board, and a transmission line.

Details thereof will be explained with reference to FIG. 2.

Figure 2:
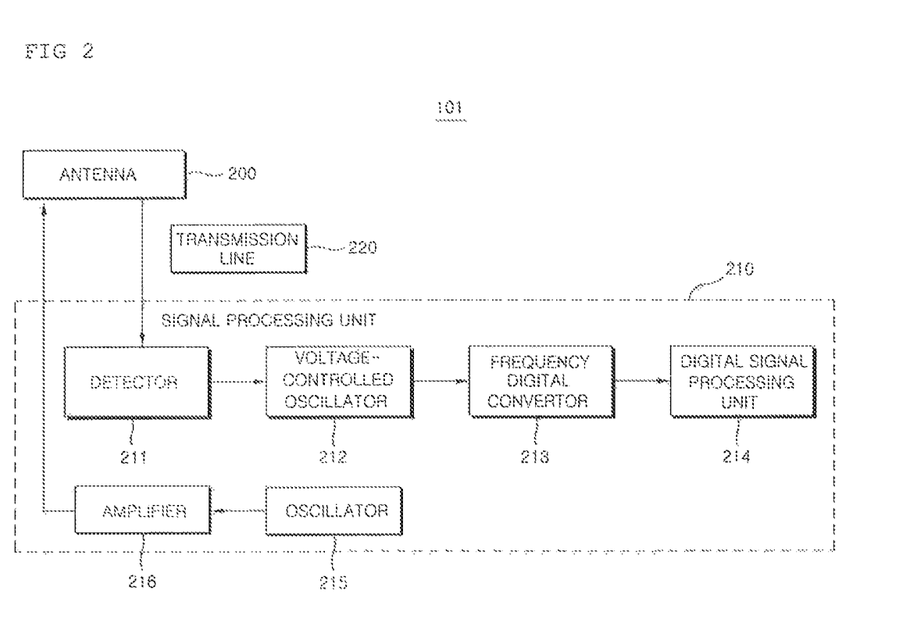
FIG. 2 is a diagram provided to explain an antenna module for transmitting or receiving a terahertz wave according to an exemplary embodiment of the present invention.

FIG. 2 is a diagram provided to explain an antenna module for transmitting or receiving a terahertz wave according to an exemplary embodiment of the present invention.

Referring to FIG. 1 and FIG. 2, the antenna module 101 for transmitting or receiving a terahertz wave includes a signal processing unit 210 and a transmission line 220.

An antenna 200 may include a radiation patch for transmitting or receiving a terahertz wave, and a first ground disposed away from the radiation patch and having a hole. The first ground may provide a reference to the radiation patch for generating a signal, and blocks ("reflects") a signal generated by the radiation patch so as not to be transmitted to a lower side of the first ground.

A signal processing unit 210 is disposed away under the antenna 200, and generates a terahertz wave transmitted through the antenna 200 or processes a terahertz wave received through the antenna 200.

The radiation path of the antenna 200 can be connected with the signal processing unit 210 by a via formed passing through a hole of the first ground.

For example, the signal processing unit 210 may include a detector 211, a voltage-controlled oscillator 212, a frequency digital convertor 213, and a digital signal processing unit 214, for processing a terahertz wave received through the antenna 200.

Although the detector 211, the voltage-controlled oscillator 212, the frequency digital convertor 213, and the digital signal processing unit 214 are described as devices for processing a terahertz wave received through the antenna 200 in the present exemplary embodiment, various other devices for processing a terahertz wave received through the antenna 200 can be included in the signal processing unit 210.

The signal processing unit 210 may be provided at an integrated circuit board.

The detector 211 is configured to detect the terahertz wave received through the antenna 200. For example, the detector 211 may be a broadband diode or a field effect transistor (FET).

The voltage-controlled oscillator 212 is configured to output an oscillation frequency according to an output voltage of the detector 211. For example, the voltage-controlled oscillator 212 may be a ring voltage-controlled oscillator.

The frequency digital convertor 213 is configured to convert the output oscillation frequency from the voltage-controlled oscillator 212 to a digital signal. For example, the frequency digital convertor 213 may be implemented by a counter.

The digital signal processing unit 214 is configured to generate data based on the converted digital signal.

For example, the signal processing unit 210 may include an oscillator 215 and an amplifier 216, for generating a terahertz wave transmitted through the antenna 200.

Although the oscillator 215 and the amplifier 216 are described as devices for generating a terahertz wave transmitted through the antenna 200 in the present exemplary embodiment, various other devices for generating a terahertz wave transmitted through the antenna 200 can be included in the signal processing unit 210.

The oscillator 215 can generate a terahertz wave.

The amplifier 216 can amplify the terahertz wave generated by the oscillator 215 and input amplified terahertz wave to the antenna 200.

For example, a via can connect the radiation patch of the antenna 200 with the detector 211 of the signal processing unit 210, or connect the radiation patch of the antenna 200 with the amplifier 216 of the signal processing unit 210.

The transmission line 220 is configured to match an impedance between the antenna 200 and the signal processing unit 210, and disposed under and away from a first ground 202.

Figure 3:
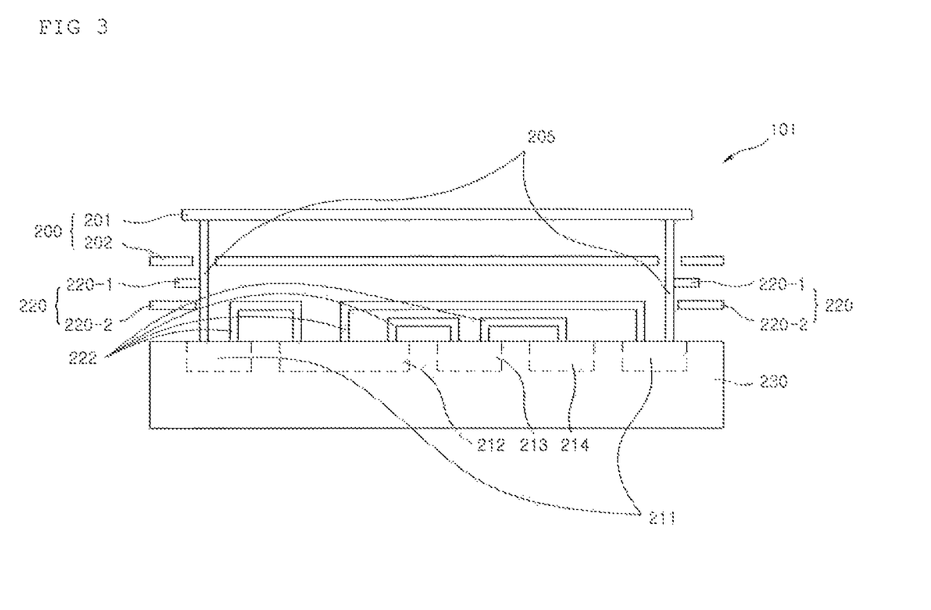
FIG. 3 is a side view of an antenna module for transmitting or receiving a terahertz wave according to an exemplary embodiment of the present invention.

Referring to FIG. 3, the transmission line 220 includes the first ground 202, a metal line 220-1, and a second ground 220-2. For example, the transmission line 220 may be formed into a stripline.

The metal line 220-1 may be disposed under and away from the first ground 202 and connected to the via.

The second ground 220-2 may be disposed under and away from the metal line 220-1.

The first ground 202 and the second ground 220-2 may provide a reference to the metal line 220-1 for generating a signal. The first ground 202 prevents the signal generated by the metal line 220-1 from being transmitted to an upper side of the first ground 202. The second ground 220-2 prevents the signal generated by the metal line 220-1 from being transmitted to a lower side of the second ground 220-2.

The first ground 202 can serve as a ground for a radiation patch 201 of the antenna 200 and a ground for the metal line 220-1. In other words, the antenna 200 and the transmission line 220 share and use the first ground 202, and, thus, the whole size or volume of the antenna module can be reduced.

Further, the first ground 202 and the second ground 220-2 separate the antenna 200 and the transmission line 220, and, thus, it is possible to prevent deterioration in performance caused by mutual signal interference.

A mutual connecting line 222 is disposed under the antenna, and mutually connects the components included in the signal processing unit 210.

A structure of the antenna module 101 for transmitting or receiving a terahertz wave will be explained with reference to FIG. 3 and FIG. 4.

FIG. 3 is a side view of an antenna module for transmitting or receiving a terahertz wave according to an exemplary embodiment of the present invention.

In the present exemplary embodiment, there will be explained a case where the signal processing unit of the integrated circuit receives and processes a terahertz wave. However, the present exemplary embodiment also includes a case where the signal processing unit of the integrated circuit generates and transmits a terahertz wave.

Referring to FIG. 1, FIG. 2 and FIG. 3, an antenna module 101 for transmitting or receiving a terahertz wave includes an antenna 200, a transmission line 220 and an integrated circuit board 230.

The antenna 200 may include a radiation patch 201 for transmitting or receiving a terahertz wave, and a first ground 202 disposed away from the radiation patch 201, and having a hole. The first ground 202 may provide a reference to the radiation patch for generating signal, and blocks ("reflects") a signal generated by the radiation patch so as not to be transmitted to a lower side of the first ground The signal processing unit 210 may be provided at an integrated circuit board 230.

The signal processing unit 210 may include a detector 211, a voltage-controlled oscillator 212, a frequency digital convertor 213, and a digital signal processing unit 214.

The signal processing unit 210 may include an oscillator 215 and an amplifier 216 for generating a terahertz wave transmitted through the antenna 200.

Although the detector 211, the voltage-controlled oscillator 212, the frequency digital convertor 213 and the digital signal processing unit 210 for processing a terahertz wave transmitted through the antenna 200, various other devices for processing a terahertz wave transmitted through the antenna 200 can be included in the signal processing unit 210.

The functions of the respective components included in the signal processing unit 210 have been already explained with reference to FIG. 2, and, thus, explanation thereof will be omitted.

The transmission line 220 is configured to match an impedance between the antenna 200 and the signal processing unit 210, and disposed under and away from a first ground 202.

The transmission line 220 includes the first ground 202, the metal line 220-1, and the second ground 220-2. For example, the transmission line 220 may be formed into a stripline.

The metal line 220-1 may be disposed under and away from the first ground 202 and connected to the via.

The second ground 220-2 may be disposed under and away from the metal line 220-1.

The first ground 220 and the second ground 220-2 may provide a reference to the metal line 220-1 for generating a signal. The first ground 220 prevents the signal generated by the metal line 220-1 from being transmitted to an upper side of the first ground 202. The second ground 220-2 prevents the signal generated by the metal line 220-1 from being transmitted to a lower side of the second ground 220-2.

The mutual connecting line 222 is disposed under the antenna 200 and may be disposed between vias 205. The mutual connecting line 222 may electrically connect the components included in the signal processing unit 210 with each other.

In the antenna module according to the present invention, the antenna and the signal processing unit are provided up and down, it is possible to remarkably reduce an area where the antenna and the signal processing unit are provided.

Also, since the focal plane array structure includes multiple antenna modules in which the antenna and the signal processing unit are provided up and down, as compared with a case of using an antenna module in which the antenna and the signal processing unit are provided on the same plane, it is possible to form more antenna modules within the same area. Since more antenna modules can be formed within the same area, the focal plane array structure according to the present invention can remarkably increase a resolution.

Further, in a top view of the focal plane array structure, the antennas arranged around the single antenna are identical from each other in a size and a gap therebetween, a symmetrical radiation characteristic can be obtained.

Furthermore, in the focal plane array, a metal plate serving as a ground is not individually formed at the antenna module, but singly formed throughout the antenna module. Thus, it is possible to surely prevent damage to the integrated circuit and thus possible to increase radiation efficiency.

Moreover, since the focal plane array can be implemented as a single unit during a process (for example, a CMOS process) having a stacked metal structure, it can be a single chip solution. If so, it is possible to reduce a size of the focal plane array structure and also possible to integrate the focal plane array structure with a chip driven together. Therefore, if a system is implemented using the focal plane array structure, the system can be implemented in a much smaller size as compared with a system connected by packaging.

Figure 4:
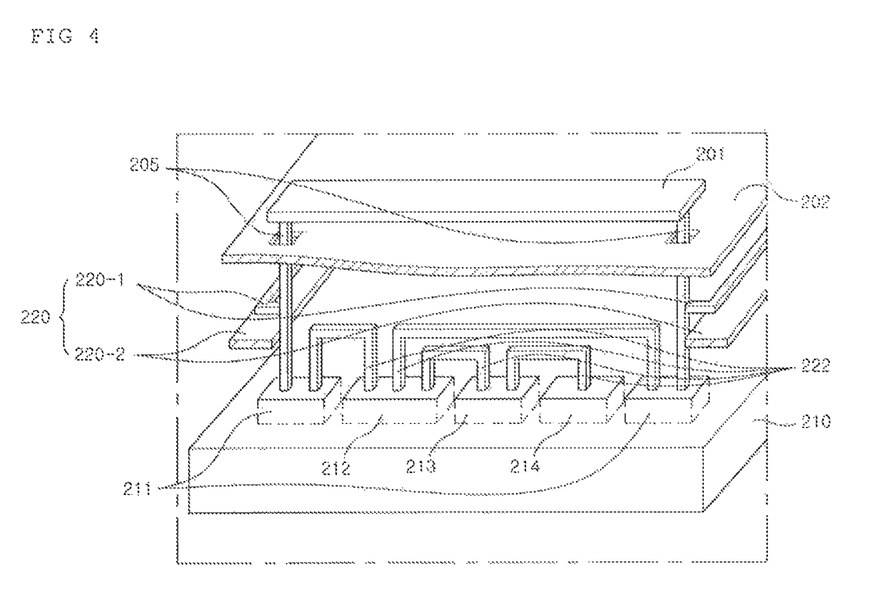
FIG. 4 is a perspective view of an antenna module for transmitting or receiving a terahertz wave according to an exemplary embodiment of the present invention.

FIG. 4 is a perspective view of an antenna module for transmitting or receiving a terahertz wave according to an exemplary embodiment of the present invention.

In the present exemplary embodiment, there will be explained a case where the signal processing unit of the integrated circuit receives and processes a terahertz wave. However, the present exemplary embodiment also includes a case where the signal processing unit of the integrated circuit generates and transmits a terahertz wave.

Referring to FIG. 1, FIG. 2, FIG. 3, and FIG. 4, the antenna module 101 for transmitting or receiving a terahertz wave includes the antenna 200, the transmission line 220, and an integrated circuit board 230.

The antenna 200 may include the radiation patch 201 for transmitting or receiving a terahertz wave and the first ground 202 disposed away from the radiation patch 201 and having a hole.

The transmission line 220 includes the first ground 202, the metal line 220-1, and the second ground 220-2. For example, the transmission line 220 may be formed into a stripline.

The metal line 220-1 may be disposed under and away from the first ground 202 and connected to the via.

The second ground 220-2 may be disposed under and away from the metal line 220-1.

The first ground 202 and the second ground 220-2 may provide a reference to the metal line 220-1 for generating a signal. The first ground 220 prevents the signal generated by the metal line 220-1 from being transmitted to an upper side of the first ground 202. The second ground 220-2 prevents the signal generated by the metal line 220-1 from being transmitted to a lower side of the second ground 220-2.

In the integrated circuit (IC) board 230, the signal processing unit 210 may be formed.

The signal processing unit 210 may include the detector 211, the voltage-controlled oscillator 212, the frequency digital convertor 213, and the digital signal processing unit 214, for processing a terahertz wave received through the antenna 200.

The signal processing unit 210 may include the oscillator 215 and the amplifier 216, for generating a terahertz wave transmitted through the antenna 200.

Although the detector 211, the voltage-controlled oscillator 212, the frequency digital convertor 213, and the digital signal processing unit 214 are described as devices for processing a terahertz wave received through the antenna 200 in the present exemplary embodiment, various other devices for processing a terahertz wave received through the antenna 200 can be included in the signal processing unit 210.

The functions of the respective components included in the signal processing unit 210 have been already explained with reference to FIG. 2, and, thus, explanation thereof will be omitted.

The mutual connecting line 222 is disposed under the antenna 200 and may be disposed between the vias 205. The mutual connecting line 222 may electrically connect the components included in the signal processing unit 210 with each other.

As explained above, an area of the antenna module 101 illustrated in FIG. 1 is the same as that of the antenna 200.

In the antenna module according to the present invention, the antenna and the signal processing unit are provided up and down, it is possible to remarkably reduce an area where the antenna and the signal processing unit are provided.

Also, since the focal plane array structure includes multiple antenna modules in which the antenna and the signal processing unit are provided up and down, as compared with a case of using an antenna module in which the antenna and the signal processing unit are provided on the same plane, it is possible to form more antenna modules within the same area. Since more antenna modules can be formed within the same area, the focal plane array structure according to the present invention can remarkably increase a resolution.

As set forth above, according to exemplary embodiments of the invention, since the antenna and the signal processing unit are provided up and down, it is possible to remarkably reduce an area where the antenna and the signal processing unit are provided.

Also, since the focal plane array structure includes multiple antenna modules in which the antenna and the signal processing unit are provided up and down, as compared with a case of using an antenna module in which the antenna and the signal processing unit are provided on the same plane, it is possible to form more antenna modules within the same area.

Further, since more antenna modules can be formed within the same area, it is possible to remarkably increase a resolution.

Furthermore, in a top view of the focal plane array structure, the antennas arranged around the single antenna are identical from each other in a size and a gap therebetween, a symmetrical radiation characteristic can be obtained.

Moreover, in the focal plane array structure, a metal plate serving as a ground is not individually formed at the antenna module, but singly formed throughout the antenna module. Thus, it is possible to surely prevent damage to the integrated circuit board and thus possible to increase radiation efficiency.

Also, since the focal plane array structure can be implemented as a single unit during a process (for example, a CMOS process) having a stacked metal structure, it can be a single chip solution. If so, it is possible to reduce a size of the focal plane array structure and also possible to integrate the focal plane array structure with a chip driven together. Therefore, if a system is implemented using the focal plane array structure, the system can be implemented in a much smaller size as compared with a system connected by packaging.

The above-described exemplary embodiments can be selectively combined in whole or in part to achieve various modifications thereof.

It should be noted that the exemplary embodiments are given for illustration, but none are intended to be limiting. Further, those skilled in the art may appreciate that various other exemplary embodiments can be implemented without departing from the spirit and scope of the present invention.

EXPLANATION OF CODES

100: Focal plane array structure
101: Antenna module
200: Antenna
210: Signal processing unit
211: Detector
212: Voltage-controlled oscillator
213: Frequency digital convertor
214: Digital signal processing unit
220: Transmission line

What is claimed is:

1. An antenna module for transmitting or receiving a terahertz wave, the antenna module comprising:
   an antenna comprising a radiation patch for transmitting or receiving the terahertz wave, a first ground disposed away from the radiation patch, and the first ground having a hole;
   an integrated circuit board having a signal processing unit configured to generate the terahertz wave or to process the terahertz wave received through the antenna, and the integrated circuit board being disposed under the antenna; and
   a via configured to connect the radiation patch with the signal processing unit, and the via passing through the hole,
   wherein the integrated circuit board comprises:
      a detector configured to detect the terahertz wave received through the antenna;
      a voltage-controlled oscillator configured to output an oscillation frequency according to an output voltage of the detector;
      a frequency digital convertor configured to convert the oscillation frequency from the voltage-controlled oscillator to a digital signal; and
      a digital signal processing unit configured to generate a data based on the converted digital signal.

2. The antenna module of claim 1, further comprising: a transmission line matching an impedance between the antenna and the signal processing unit included in the integrated circuit board, and the transmission line is disposed away from the first ground and located under the first ground.

3. The antenna module of claim 2, wherein the transmission line comprises: a metal line combined with the via, the metal line is disposed away from the first ground and being located under the first ground; and a second ground is disposed away from the metal line and being located under the metal line.

4. The antenna module of claim 3, wherein the first ground is configured to function as a ground for the radiation patch and the metal line.

5. The antenna module of claim 1 further comprising:
   a mutual connecting line configured to mutually connect the detector, the voltage-controlled oscillator, the frequency digital convertor, and the digital signal processing unit, and the mutual connecting line being disposed under the antenna.

6. An antenna nodule for transmitting or receiving a terahertz wave, the antenna module comprising:
   an antenna comprising radiation patch for transmitting or receiving the terahertz wave, a first ground disposed away from the radiation patch, and the first ground having a hole;
   an integrated circuit board having a signal processing unit configured to generate the terahertz wave or to process the terahertz wave received through the antenna, and the integrated circuit board being disposed under the antenna; and
   a via configured to connect the radiation patch with the signal processing unit, and the via passing through the hold,
   wherein, the integrated circuit board comprises:
      an oscillator configured to generate the terahertz wave; and
      an amplifier configured to amplify the generated terahertz wave,
   further comprising a mutual connecting line configured to mutually connect the oscillator and the amplifier, and the mutual connecting Line being disposed under the antenna.

7. A focal plane array for real-time terahertz imaging, comprising;
   an antenna array where the plurality of antenna modules are spaced to be disposed, the antenna module including a radiation patch receiving the terahertz wave, a first ground disposed away from the radiation patch, and the first ground having a hole;
   an integrated circuit board comprising a signal processing unit disposed under the antenna array and configured to process the terahertz wave received through the antenna; and
   a via configured to connect the radiation patch and the signal processing unit, and the via passing through the hole,
   wherein the integrated circuit board comprises:
      a detector configured to detect the terahertz wave received through the antenna;
      a voltage-controlled oscillator configured to output an oscillation frequency according to an output voltage of the detector;
      a frequency digital convertor configured to convert the oscillation frequency from the voltage-controlled oscillator to a digital signal; and
      a digital signal processing unit configured to generate data based on the converted digital signal.

8. The focal plane array of claim 7, further comprising: a transmission line matching an impedance between the antenna and the signal processing unit included in the integrated circuit board, and the transmission line disposed away from the first ground and located under the first ground.

9. The focal plane array of claim 8, wherein the transmission line comprises: a metal line combined with the via, the metal line is disposed away from the first ground and located under the first ground; and a second ground is disposed away from the metal line and located under the metal line.

10. The focal plane array of claim 7, wherein the first ground is formed as a single ground corresponding to the antenna array.

11. The focal plane array of claim 7, wherein the signal processing unit is correspondently disposed with the each antenna.

12. The focal plane array of claim 7, wherein the detector is correspondently disposed with the each antenna, and each of the voltage-controlled oscillator, the frequency digital convertor, and the digital signal processing unit is a single component, and configured to process the received terahertz wave through the detector.

13. The focal plane array of claim 7, further comprising: a mutual connecting line configured to mutually connect the detector, the voltage-controlled oscillator, the frequency digital convertor, and the digital signal processing unit, and the mutual connecting line is disposed under the antenna.

* * * * *